(12) United States Patent
Maier

(10) Patent No.: US 7,634,963 B2
(45) Date of Patent: Dec. 22, 2009

(54) PISTON RING COMPRISING A COATED RUNNING SURFACE, AND COATING AGENT

(75) Inventor: Kurt Maier, Leonberg (DE)

(73) Assignee: Mable International GmbH, Stuttgart (DE)

( * ) Notice: Subject to any disclaimer, the term of this patent is extended or adjusted under 35 U.S.C. 154(b) by 288 days.

(21) Appl. No.: 11/791,911

(22) PCT Filed: Nov. 28, 2005

(86) PCT No.: PCT/DE2005/002139
§ 371 (c)(1),
(2), (4) Date: Jul. 11, 2007

(87) PCT Pub. No.: WO2006/058520
PCT Pub. Date: Jun. 8, 2006

(65) Prior Publication Data
US 2008/0127819 A1   Jun. 5, 2008

(30) Foreign Application Priority Data
Nov. 30, 2004   (DE) .................. 10 2004 057 560

(51) Int. Cl.
F16J 9/00 (2006.01)
C08L 79/08 (2006.01)
(52) U.S. Cl. .......................... 92/212; 92/248
(58) Field of Classification Search .............. 92/212, 92/248
See application file for complete search history.

(56) References Cited

U.S. PATENT DOCUMENTS

| | | |
|---|---|---|
| 4,963,627 A | 10/1990 | Smyser et al. |
| 5,430,938 A | 7/1995 | Rao et al. |
| 5,598,763 A | 2/1997 | Rao et al. |
| 5,988,649 A | 11/1999 | Van Ryper et al. |
| 6,207,236 B1 | 3/2001 | Araki et al. |
| 6,349,943 B1 | 2/2002 | Ishii et al. |
| 6,457,722 B1 | 10/2002 | Feistel |
| 7,034,076 B2 * | 4/2006 | Torii et al. .................. 525/179 |
| 7,121,192 B2 * | 10/2006 | Smith et al. .................... 92/223 |

FOREIGN PATENT DOCUMENTS

| | | |
|---|---|---|
| CH | 577 565 | 7/1976 |
| DE | 39 03 722 C2 | 8/1989 |
| DE | 195 04 803 C2 | 9/1995 |
| DE | 195 06 910 C2 | 9/1995 |
| EP | 0 376 347 A2 | 7/1990 |
| EP | 0 832 384 B1 | 4/1998 |
| EP | 0 985 108 B1 | 3/2000 |
| JP | 2001031906 | 2/2001 |
| JP | 2001031906 A * | 2/2001 |

OTHER PUBLICATIONS

International Search Report.

* cited by examiner

*Primary Examiner*—Thomas E Lazo
(74) *Attorney, Agent, or Firm*—Collard & Roe, P.C.

(57) ABSTRACT

The invention relates to a piston ring whose running surface is provided with a coating containing a plastic material. Said piston ring is characterized in that the coating is composed of at least one polyamide-imide and/or at least one polyether ether ketone with embedded particles which can be embodied as hard material particles, solid lubricant particles, or metallic particles. The invention further relates to a piston/piston ring arrangement comprising at least one inventive piston ring and an agent for coating at least the running surface of the piston ring.

15 Claims, 1 Drawing Sheet

PISTON RING COMPRISING A COATED RUNNING SURFACE, AND COATING AGENT

CROSS REFERENCE TO RELATED APPLICATIONS

Figure 1:
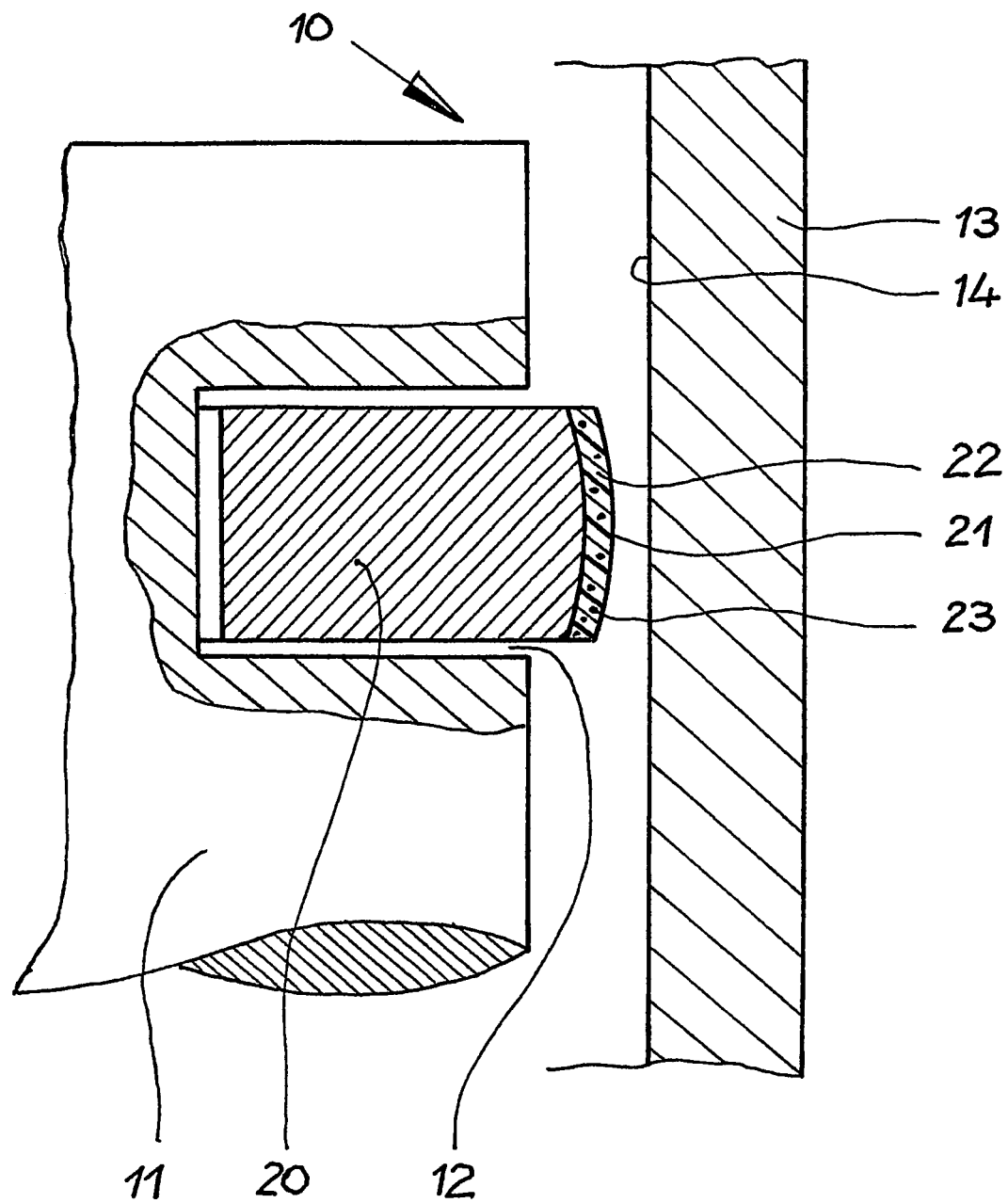

Applicant claims priority under 35 U.S.C. §119 of German Application No. 10 2004 057 550.6 filed Nov. 30, 2004. Applicant also claims priority under 35 U.S.C. §365 of PCT/DE2005/002139 filed Nov. 28, 2005. The international application under PCT article 21(2) was not published in English.

The invention relates to a piston ring whose working surface is provided with a coating containing a plastic. The present invention furthermore relates to a coating agent suitable for this purpose.

In the state of the art, it is known to provide piston rings, or at least their working surfaces, with a self-lubricating slide layer of synthetic resin with embedded graphite. Such slide layers are described, for example, in the Swiss patent CH 577 565. In modern internal combustion engines, however, such slide layers no longer meet the requirements with regard to mechanical strength and temperature stability.

DE 195 06 910 C2 describes a piston/piston ring arrangement having a pair of piston rings, in which the surfaces of groove and piston ring pair are covered with a film of solid lubricant. This film contains a specific mixture of solid lubricant agents that are embedded into a carrier of polyamide or epoxy resin, in a proportion of up to 58 wt.-%. The solid lubricant agents assure the necessary temperature stability of the film. A similar solid lubricant film is described in DE 195 04 803.

DE 39 03 722 C2 discloses a piston/piston ring arrangement in which the surfaces of the groove and of the piston ring—with the exception of the working surface of the piston ring—are provided with a solid lubricant film on the basis of polyamide or polyimide. In this way, the piston is prevented from sticking to the piston ring.

However, such solid lubricant films cannot be used for the working surfaces of piston rings, because completely different demands are made on the tribosystem piston ring/cylinder working surface than on the tribosystem piston ring/groove.

It is therefore the task of the present invention to make available a coated piston ring and a coating agent, respectively, which are suitable for modern internal combustion engines and improve the running-in properties.

The solution consists of a piston ring having the characteristics of claim 1, and a coating agent having the characteristics of claim 11, respectively. According to the invention, it is provided that the coating consists of at least one polyamide-imide and/or at least one polyether ether ketone having embedded particles.

It has turned out that polyamide-imides and polyether ether ketones satisfy the increased demands made on slide layers for modern internal combustion engines. Polyamide-imides and polyether ether ketones, respectively, form slide layers, together with the particles, i.e. the particles are embedded in a matrix of polyamide-imides or polyether ether ketones. The slide layer is sufficiently temperature-resistant (at least up to 250° C.) and does not wear too quickly. As a result, the slide properties of the slide layers remain in existence essentially without being impaired, during the running-in phase. This results in an improved running-in behavior of the internal combustion engine. The formation of scuff marks during the running-in phase is avoided. After completion of the running-in phase, the slide layer is no longer needed and can therefore have worn away.

As compared with the polyimides known in the state of the art, the piston rings and coating agents according to the invention have the advantage that they demonstrate greater strength and impact resistance. This also increases their friction-wear resistance, so that the coating does not wear away too quickly. Furthermore, the piston rings and coating agents according to the invention have a lower friction coefficient, which promotes their tribological behavior. The piston rings and coating agents according to the invention are furthermore less sensitive to temperature peaks, as compared with the state of the art, so that heating to temperatures of up to 450° C. for a short period of time, for example, is not harmful.

Polyamide-imides (PAI) are polymers that carry both amide and imide functionalities in their main chains. Methods for their production are generally known. For example, they can be produced by means of polycondensation of tricarboxylic acid anhydrides, for example trimellitic acid anhydride, or the chlorides of these carboxylic acids with diisocyanates or diamines, respectively. Polymerization takes place in solution. They can be processed directly from the solution. Polyamide-imides are very temperature-resistant and solvent-resistant.

Polyether ether ketones (PEEK) are polymers whose phenylene radicals are alternately linked by way of two ether groups and one ketone group, in each instance. They are produced in known manner, by means of polycondensation of 4-phenoxybenzoyl chloride or terephthalic acid dichloride and diphenyl ether, in the presence of Friedel-Crafts catalysts (for example $AlCl_3$). Polyether ether ketones are partially crystalline thermoplastics having a high melting point, and having very good heat shape retention, among other things. They can easily be processed by means of injection molding. The polyether ether ketones used according to the invention can be substituted in any desired manner at their phenyl radicals.

The particles can serve, depending on the use, as polishing agents, as lubricants, or to increase the strength of the plastic matrix. The plastic into which the particles are mixed is injection-molded or pressed onto the working surface of the piston ring in known manner.

Furthermore, a piston/piston ring arrangement for an internal combustion engine is an object of the present invention, whereby at least one piston ring is provided with a coating according to the invention.

Practical further developments are evident from the dependent claims.

Preferably, polyamide-imides or polyether ether ketones are used that have been thermally hardened or are thermally hardened after application of the coating agent onto the piston ring. This facilitates processing. The layer thickness of the coating can amount to 1 to 20 µm, preferably 3 to 8 µm.

The quantity of the particles can amount to approximately 0.1 to 40 wt.-%, preferably approximately 0.5 to 20 wt.-%, with reference to the coating. An overly high particle proportion results in increased friction wear of the cylinder working surface and of the slide layer, and reduces the temperature resistance of the plastic matrix too greatly. An overly low particle proportion has no effect.

The grain size of the particles lies in the range of approximately 0.1 to 10 µm, preferably approximately 0.5 to 2 µm, for example. Here again, it holds true that overly great particle sizes lead to increased friction wear of the cylinder working surface and of the slide layer, and reduce the temperature resistance of the plastic matrix, while overly small particles demonstrate no effect.

The particles can be hard substance particles, for example. Suitable materials are, among others, aluminum oxide, silicon carbide, silicon nitride, tungsten carbide, diamond, boron carbide, or chrome carbide. They have the effect that the cylinder working surface is finely polished, similar to the situation with fine honing, so that peaks of roughness are worn away. For this purpose, their grain size and their quantity should lie within the preferred ranges mentioned above.

Instead or in addition, solid lubricant particles can also be embedded, which can consist, for example, of graphite, molybdenum sulfide, tungsten sulfide, polytetrafluoroethylene, or hexagonal boron nitride. Lubricant particles contribute to preventing the formation of scuff marks during the running-in phase. In order to be able to support this in particularly effective manner, the solid lubricant particles should be present in grain sizes and quantity ranges as explained above. In particular, if the quantity of the solid lubricant particles is too high, the plastic matrix is no longer able to touch and surround all of the particles. As a result, the mechanical strength of the slide layer is reduced, so that it is worn away too quickly, i.e. before completion of the running-in phase. The same disadvantageous effect is observed if the grain size becomes too small. The total surface of the particles then becomes so great that the particles are also no longer reliably touched and bound in by the plastic matrix. If, on the other hand, the grain size is too great, particularly greater than the layer thickness, rough, non-homogeneous layers with a low lubricant effect are formed.

Finally, for further solidification of the slide layer, metallic particles of iron, copper, bronze, brass, aluminum, titanium, or tin can be contained in the slide layer. Here again, the quantity and grain size should lie in the range mentioned above, so that friction wear and temperature resistance are not negatively influenced.

The piston ring itself can consist of all the materials suitable for the area of application, in each instance, for example of nitrided steel. In addition, the piston ring can be provided with known friction-wear-resistant layers on the working surface; in this connection, the coating according to the invention is applied onto the friction-wear-resistant coating.

FIG. 1 is an enlarged sectional view of a portion of a coated piston ring of the present invention.

Exemplary embodiments of the present invention will be explained in greater detail below, using the attached drawing. The single FIGURE shows, in schematic representation, not to scale, a section through a piston/piston ring arrangement 10. The piston 11, in known manner, has piston ring grooves 12. A piston ring 20 is set into the piston ring groove 12. The side surface of the piston ring 20 that projects radially outward out of the piston ring groove 12 serves as the working surface 21, which stands in tribological interaction with the cylinder working surface 14 of a cylinder 13.

The working surface 21 of a piston ring 20 is provided with a coating 22 of a polyamide-imide or a polyether ether ketone.

Particles 23 are embedded in the coating 22; these consist of a hard substance, a solid lubricant and/or a metal or an alloy.

Suitable polyamide-imides are commercially available under the trade names Torlon® and Kermel®, for example. Suitable polyether ether ketones are known under the trade names Victrex®, Zyex®, Hostatec®, and Ketron®, for example.

The polyamide-imide preferably has the general formula (I)

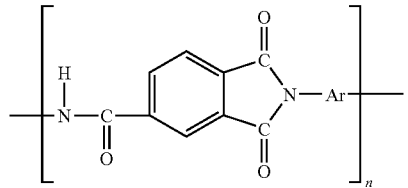

where Ar stands for an aryl group, for example

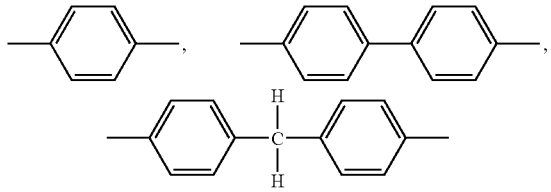

and n is a whole number between 2 and 200.

The raw material used is preferably a mixture of an amidic acid having the general formula (III)

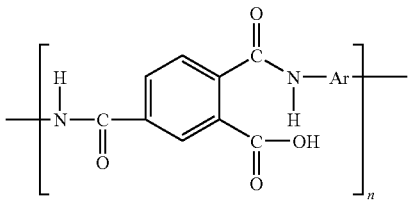

and an imide having the general formula (I).

This mixture is dissolved in an aprotic solvent. N-methyl pyrrolidone (NMP) is preferred, because it has little odor and little toxicity. The mixture is thermally hardened, whereby three processes take place at the same time:
1. The solvent is removed, because it evaporates.
2. The amidic acid is imidized, i.e. converted to the imide, splitting off water.
3. At the same time, chain growth takes place, so that the molecular weight of the polyamide-imide is increased.

The polyether ether ketone preferably has the general formula (II)

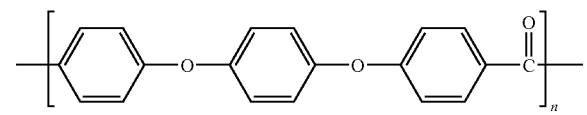

whereby the phenylene radicals can be substituted in any desired manner, and n is a whole number from 2 to 200.

The coating agent can be produced according to methods that are known to a person skilled in the art for the production of varnishes. The particles are stirred into the plastic, which has not been hardened and is diluted with a suitable solvent. If necessary, processing aids for achieving a stable dispersion can be added. If necessary, viscosity adjustment agents and defoamers are added, preferably in low amounts. The viscosity is adjusted in accordance with the later processing method, by means of adding solvent.

Spraying and screen printing are particularly suitable as a processing method. After the coating has been applied, thermal hardening takes place, for example 15 to 30 minutes at 200 to 220° C. It is recommended to clean the surface to be coated before the coating is applied. Residues of oils, greases, particles, salts, etc. should be carefully removed. The surface to be coated should be dry. The surface to be coated can also be phosphatized or provided with a hard, friction-wear-resistant layer, for example CrN.

In a first exemplary embodiment, piston rings of spherolitic cast iron are used. The rings are hard-chromed at the working surfaces, in accordance with the state of the art, and subsequently ground to measure. Afterwards, they are carefully cleaned and dried. The coating agent is produced from polyamide-imide base resin. 5 g aluminum oxide and 10 g graphite, one after the other, are added to a quantity that contain 100 g resin solids, and stirred intensively. It is recommended to add small quantities of the known varnish processing aids in order to obtain a stable, non-foaming dispersion having good running properties. Subsequently, the mixture is diluted to a consistency capable of being sprayed, with the solvent NMP (N-methyl pyrrolidone). The piston rings are stacked in a column, the ring joints are covered with a template, and the coating agent is sprayed onto the working surfaces of the rings. Afterwards, the coating is hardened in an oven at 200° C. and a dwell time of 30 minutes. If minor irregularities have formed on the layer surface, these can be removed by means of brushing.

In a second exemplary embodiment, piston rings of nitrided steel are used, which are provided with a chrome nitride layer on the working surface, applied using a PVD method. The coating agent is produced from polyamide-imide base resin. 4 g aluminum oxide and 8 g molybdenum disulfide, one after the other, are added to a quantity that contain 100 g resin solids, and stirred intensively. It is recommended to add small quantities of the known varnish processing aids in order to obtain a stable, non-foaming dispersion having good running properties. Subsequently, the mixture is diluted to a consistency capable of being screen-printed, with a little solvent NMP (N-methyl pyrrolidone). The piston rings, which have been carefully cleaned and dried, are braced onto a mandrel, whereby the joints are closed. Then, the rings are coated using the screen printing method. Afterwards, the coating is hardened in an oven at 200° C. and a dwell time of 30 minutes. If minor irregularities have formed on the layer surface, these can be removed by means of brushing.

In a third exemplary embodiment, piston rings of nitrided steel are used. The coating agent is produced from polyether ether ketone base resin. 4 g brass powder and 10 g PTFE, one after the other, are added to a quantity that contain 100 g resin solids, and stirred intensively. It is recommended to add small quantities of the known varnish processing aids in order to obtain a stable, non-foaming dispersion having good running properties. Subsequently, the mixture is diluted to a consistency capable of being screen-printed, with a little solvent NMP (N-methyl pyrrolidone). The piston rings, which have been carefully cleaned and dried, are braced onto a mandrel, whereby the joints are closed. Then, the rings are coated using the screen printing method. Afterwards, the coating is hardened in an oven at 200° C. and a dwell time of 30 minutes. If minor irregularities have formed on the layer surface, these can be removed by means of brushing.

The invention claimed is:

1. A piston ring having a tribological working surface that is provided with a coating containing a plastic, wherein the coating has at least one of a polyamide-imide and a polyether ether ketone having embedded metallic particles, said metallic particles being selected from the group consisting of iron, copper, bronze, brass, aluminum, titanium, and tin.

2. The piston ring according to claim 1, wherein the quantity of the particles amounts to 0.1 to 40 wt.-%.

3. The piston ring according to claim 1, wherein the grain size of the particles amounts to 0.1 to 10 mm.

4. The piston ring according to claim 1, wherein the coating has at least one of embedded hard substance particles and solid lubricant particles.

5. The piston ring according to claim 4, wherein the hard substance particles are selected from the group consisting of aluminum oxide, silicon carbide, silicon nitride, tungsten carbide, diamond, boron carbide, and chrome carbide.

6. The piston ring according to claim 4, wherein the solid lubricant particles are selected from the group consisting of graphite, molybdenum sulfide, tungsten sulfide, polytetrafluoroethylene, and boron nitride.

7. The piston ring according to claim 1, wherein the piston ring comprises nitrided steel.

8. A piston/piston ring arrangement for an internal combustion engine, wherein the piston/piston ring arrangement has at least one piston ring according to claim 1.

9. A coating agent for a tribological working surface, wherein the coating agent has at least one of a polyamide-imide and a polyether ether ketone having embedded metallic particles, said metallic particles being selected from the group consisting of iron, copper, bronze, brass, aluminum, titanium, and tin.

10. The coating agent according to claim 9, wherein the quantity of the particles amounts to 0.1 to 40 wt.-%.

11. The coating agent according to claim 9, wherein the grain size of the particles amounts to 0.1 to 10 mm.

12. The coating agent according to claim 9, wherein the coating has at least one of embedded hard substance particles and solid lubricant particles.

13. The coating agent according to claim 12, wherein the hard substance particles are selected from the group consisting of aluminum oxide, silicon carbide, silicon nitride, tungsten carbide, diamond, boron carbide, and chrome carbide.

14. The coating agent according to claim 12, wherein the solid lubricant particles are selected from the group consisting of graphite, molybdenum sulfide, tungsten sulfide, polytetrafluoroethylene, and boron nitride.

15. A use of a coating agent according to claim 9 for coating the tribological working surface of a piston ring.

* * * * *